United States Patent [19]

Motonami et al.

[11] 4,372,580

[45] Feb. 8, 1983

[54] AUTOMATIC SEATBELT SYSTEM

[75] Inventors: Masanao Motonami, Toyota; Hisashi Ogawa, Okazaki; Yoshikazu Imai, Toyota, all of Japan

[73] Assignee: Toyota Jidosha Kogyo Kabushiki Kaisha, Tokyo, Japan

[21] Appl. No.: 221,366

[22] Filed: Dec. 29, 1980

[30] Foreign Application Priority Data

Feb. 18, 1980 [JP] Japan .......................... 55-19480[U]

[51] Int. Cl.³ .............................................. B60R 21/10
[52] U.S. Cl. .................................. 280/802; 280/806; 280/807; 280/808; 24/196
[58] Field of Search .................... 180/268, 269, 270; 280/802, 803, 804, 806, 808; 297/469, 474, 475–480; 24/196

[56] References Cited

U.S. PATENT DOCUMENTS

| | | | |
|---|---|---|---|
| 4,084,841 | 4/1978 | Hayashi et al. | 280/802 |
| 4,213,637 | 7/1980 | Mauron | 280/803 |
| 4,230,343 | 10/1980 | Takada | 280/803 |
| 4,256,329 | 3/1981 | Winnale | 280/808 |
| 4,262,932 | 4/1981 | Motonami | 280/802 |
| 4,277,037 | 7/1981 | Loose et al. | 280/806 |
| 4,278,215 | 7/1981 | Nakaho | 280/806 |

*Primary Examiner*—Robert R. Song
*Attorney, Agent, or Firm*—Stevens, Davis, Miller & Mosher

[57] ABSTRACT

An automatic seatbelt system for automatically fastening an outer webbing and an inner webbing to an occupant upon being seated, wherein opposite ends of the outer webbing are engaged with the upper and lower portions of a vehicle door, respectively, the base portion of the inner webbing is wound into a retractor provided at substantially the central portion of the vehicle, and, in an emergency of a vehicle, the intermediate portion of the inner webbing is directly locked, so that the inner webbing can be prevented from being wound out of the retractor. Further, the forward end of the inner webbing is adapted to guide the intermediate portion of the inner webbing through a through-ring, prevent the outer webbing from moving in the longitudinal direction thereof to improve the occupant restraining characteristics in an emergency of a vehicle, and the intermediate portion of the inner webbing is moved forward in the vehicle when the occupant enters or leaves the vehicle to facilitate actions of the occupant in entering or leaving the vehicle.

9 Claims, 11 Drawing Figures

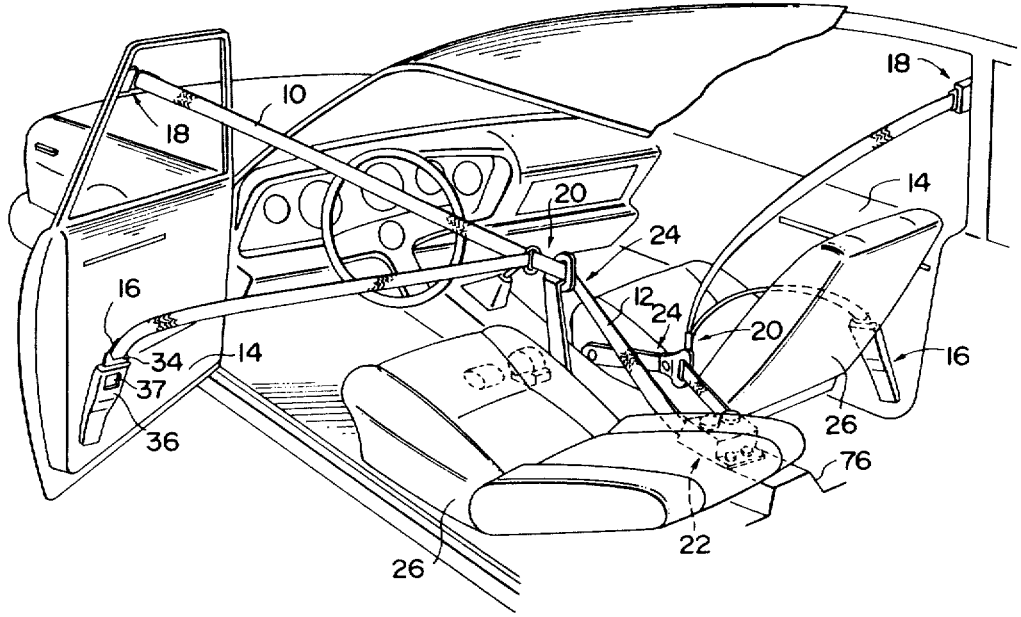

AUTOMATIC SEATBELT SYSTEM

BACKGROUND OF THE INVENTION

1. Field of the Invention

The present invention relates to seatbelt systems for protecting occupants in vehicles, and more particularly to an automatic seatbelt system capable of automatically fastening the seatbelt system to an occupant.

2. Description of the Prior Art

Previously, there have been proposed automatic seatbelt systems for automatically fastening a seatbelt system to an occupant in a vehicle. In this type of automatic seatbelt system, one end of an occupant restraining webbing is secured to a door of the vehicle, and the other end is wound into a retractor provided at substantially the central portion of the vehicle, whereby, if the occupant opens the door, a space for the occupant to enter or leave the vehicle is adapted to be formed between the webbing and a seat in the vehicle, and, if the occupant closes the door upon being seated, the webbing is moved rearward in the vehicle in accordance with the arcuate closing motion of the door, so that the webbing can be automatically fastened to the occupant.

However, this type of seatbelt system presents disadvantages such as the space for the occupant to enter or leave the vehicle formed between the webbing and the seat when the occupant opens the door being insufficient so as to disturb the entering or leaving of the occupant, and the webbing sliding on the chest of the occupant due to the door opening action of the occupant, to thereby give an uncomfortable feeling to the occupant.

SUMMARY OF THE INVENTION

The present invention has been developed to obviate the above described disadvantages and has as its object the provision of an automatic seatbelt system, wherein, even in an automatic seatbelt system capable of automatically fastening the webbing to or unfastening same from an occupant by the opening or closing action of the door of the vehicle, a space for the occupant to enter or leave the vehicle can be satisfactorily secured and the webbing does not slide on the chest of the occupant in its movement.

The automatic seatbelt system according to the present invention is of such an arrangement that the seatbelt system includes an outer webbing and an inner webbing. One end of the outer webbing is secured to the lower portion of the door through a first anchor portion and the other end thereof is secured to the upper portion of the door through a second anchor portion. The first anchor portion is secured to the door through a tongue plate and a buckle device which is erected from a portion, where the first anchor portion is mounted on the door, through a steel plate. The intermediate portion of the outer webbing is turned back at a through-ring, which is secured to the forward end of the inner webbing and adapted to prevent the outer webbing from moving in the longitudinal direction in an emergency of the vehicle. The inner webbing is wound into a retractor provided at substantially the central portion of the vehicle, and this retractor is adapted to directly lock the intermediate portion of the webbing, to thereby stop the windout of the webbing in an emergency of the vehicle. Furthermore, the intermediate portion of the inner webbing is adapted to move forward in the vehicle when the occupant enters or leaves the vehicle, thereby enabling enlargement of the space for the occupant to enter or leave the vehicle.

BRIEF DESCRIPTION OF THE DRAWINGS

FIG. 1 is a perspective view showing an embodiment of the automatic seatbelt system according to the present invention;

FIG. 2 is a sectional view showing a first anchor portion;

FIG. 3 is a sectional view showing a second anchor portion;

FIG. 4 is a disassembled perspective view showing the relationship between the anchor bolt and the striker;

FIG. 5 is a front view showing the through-ring;

FIG. 6 is a sectional view taken along the line VI—VI in FIG. 5;

FIG. 7 is a enlarged sectional view showing the retractor;

FIG. 8 is a side view of the vehicle seat showing the guide device;

FIG. 9 is a perspective view showing the driven state of the guide device;

FIG. 10 is an electrical wiring diagram showing the driven state of the guide device; and FIG. 11 is a sectional view taken along the line XI—XI in FIG. 8.

DESCRIPTION OF THE PREFERRED EMBODIMENT

Description will hereunder be given to an embodiment of the present invention with reference to the drawings.

As shown in FIG. 1, in the seatbelt system according to the present invention, an outer webbing 10 and an inner webbing 12 are provided in the driver's seat and the passenger's seat, respectively. One end of the outer webbing 10 is secured to the lower portion of a vehicle door 14 through a first anchor portion 16 and the other end thereof is secured to the upper portion of the vehicle door 14 through a second anchor portion 18. The intermediate portion of the outer webbing 10 is turned back at a through-ring 20 provided at the forward end of the inner webbing 12 which is wound by a biasing force into a retractor 22 provided at substantially the central portion of the vehicle. Furthermore, the intermediate portion of the inner webbing 12 is adapted to be moved forward in the vehicle by a guide device 24, to thereby enlarge the space for the occupant to enter or leave the vehicle which is formed between the webbings 10 and 12 and the vehicle seat 26.

Detailed description will now be given to these various parts. As shown in FIG. 1, the first anchor portion 16 secured thereto with one end of the outer webbing 10 is constructed such that, as shown in FIG. 2, an anchor plate 28 made of a steel plate is solidly secured to the vehicle door 14 through a bolt 30, and a buckle device 32 is solidly secured to the forward end of this anchor plate 28. This buckle device 32 is provided at a portion above the mounting bolt 30 for the anchor plate 28 so as to erect the buckle device 32 from the lower portion of the door, so that, as shown in the driver's seat in FIG. 1, the outer webbing 10 can avoid disturbing the actions of legs of the occupant when the occupant enters or leaves the vehicle.

Engageable with the buckle device 32 is a tongue plate 34 engaged at one end thereof with one end of the outer webbing 10, whereby the outer webbing 10 is adapted to be engaged with the door 14 through the anchor portion 16. However, in this buckle device 32, there is provided a release lever 37 for the occupant to cause the tongue plate 34 to fall off when necessary, so that the occupant can escape from the vehicle to the outside by releasing the tongue plate 34 from the buckle device 32 during an emergency.

Additionally, the anchor portion 16 is covered by a cover 36 made of a synthetic resin material.

Description will now be given of the second anchor portion 18 with reference to FIGS. 3 and 4. The other end of the outer webbing 10 is engaged with an anchor plate 38 of a substantially letter 'L' shape. This anchor plate 38 is secured to a mounting block 44 fixed to a window frame 42 of the vehicle door 14 through a rivet 40, whereby the other end of the outer webbing 10 is engaged with the door 14.

Solidly secured to the mounting block 44 are a pair of anchor bolts 46 shown in FIG. 4, and these anchor bolts 46 move in the direction indicated by an arrow A in FIGS. 3 and 4 when the door is closed and are inserted into slot-like cutins 52 of a striker 50 fixed to a center pillar 48 of the vehicle.

The striker 50 is of substantially letter 'U' shape in lateral cross section and formed with a recess 60, into which enlarged forward end portions 58 are inserted, between a mounting piece 54 for mounting it to the center pillar 48 and an engageable piece 56 formed with slot-like cutins 52. Consequently, when the door 14 is closed as shown in FIG. 3, the anchor bolts 46 are inserted into the slot-like cutins 52 and the enlarged forward end portions 58 enter the recess 60 to be disposed more rearwardly in the vehicle than the engageable piece 56. Thus, even if a large tensile force acts on the outer webbing in an emergency of the vehicle, the enlarged forward and portions 58 abut against the engageable piece 56, so that the tensile force can be imparted to the center pillar 48, thereby preventing the breakdown of the window frame 42.

Description will now be given of the through-ring 20 with reference to FIGS. 5 and 6. The through-ring 20 is constructed such that a core metal 64 having a rectangular opening 62 is covered with a molded resin 66 and the inner webbing 12 is inserted through and turned back at the opening 62 and then sewn onto itself, whereby the inner webbing 12 holds the through-ring 20.

While, the intermediate portion of the outer webbing 10 is inserted into the opening 62 from one side, and then, wound around a tilt bar 68 disposed at the other side of the opening 62. A space for allowing the outer webbing 10 to pass through freely is formed between the outer periphery of the tilt bar 68 and the molded resin 66, whereby the outer webbing 10 passes through the through-ring 20 for free movement, so that proper webbing fastened conditions can be secured for the occupants having various physical builds and in the case they change their driving postures. However, when high tensile forces act on the webbings, a sheet spring 70 securing this tilt bar 68 to the core metal 64 is bent to approach the molded resin 66, so that the tilt bar 68 can clamp the outer webbing 10 with the molded resin 66 to prevent the webbing 10 from moving in the longitudinal direction at the portion of the through-ring 20, thereby providing a positive restraining condition.

In addition, this through-ring 20 is not limited to the above-described arrangement, but all such variations are applicable that, in the case the tensions of the webbings are increased, the outer webbing 10 can be prevented from moving in the longitudinal direction.

Description will hereunder be given of the retractor 22 with reference to FIG. 7. A frame 72 is solidly secured to a floor tunnel portion 76 formed at substantially the central portion of the vehicle through mounting bolts 74. A pair of takeup shafts 78 are pivotally supported on this frame 72 and are adapted to wind up the inner webbings 12 of the driver's seat and the assistant driver's seat, respectively. These takeup shafts 78 are solidly secured thereto with ratchet wheels 80, respectively, and adapted to come into meshing engagement with pawls 84 driven by an acceleration sensor 82 during an emergency of the vehicle, so that the webbing windout rotations of the takeup shafts 78 can be prevented. Further, these takeup shafts 78 are secured thereto with spiral springs, not shown, to thereby wind up the inner webbings 12 by biasing forces.

The inner webbing 12 wound out of the takeup shaft 78 is wound around a guide roll 86 pivotally supported on the frame 72 and a roll 90 pivotally supported at the forward end of a lock bar 88. One end of the lock bar 88 is pivotally supported on the frame 72 through a pivot 92. Wave-shaped projections 96 of the lock bar 88 are spaced apart from wave-shaped projections 100 of the lock member 98 solidly secured to the frame 72 by a biasing force of a sheet spring 94 during normal running condition of the vehicle, thereby allowing the inner webbing 12 to pass through a space formed between these waveshaped projections 96 and 100. However, if the tension of the webbing 12 is increased, then the lock member 88 rotates against the biasing force of the sheet spring 94, and the waveshaped projections 96 strongly press the intermediate portion of the webbing 12 against the waveshaped projections 100 of the lock member 98, whereby the intermediate portion of the outer webbing 10 is directly clamped, so that the outer webbing 10 cannot be wound out of the takeup shaft 78.

As described above, the retractor 22 winds up the inner webbings provided in the driver's seat and the assistant driver's seat, respectively, and is provided therein with a pair of lock means for stopping the windout of the inner webbings in an emergency of the vehicle, and hence, can contribute to decrease the number of parts and reduce the number of man-hours in assembling work as compared with the case where retractors in the driver's seat and the passenger's seat are separately provided.

Description will now be given of the guide device 24 with reference to FIG. 8. In the guide device 24, a guide arm 102 is pivotally supported on the seat 26 through an arm rotary shaft 104. The arm rotary shaft 104 is connected to a motor 110 through a pair of worm wheels 106 and a pair of worm gears 108. As shown by the electrical wiring diagram in FIG. 10, this motor 110 is adapted to be controlled by a motor control circuit 112 such that it rotates in the normal or opposite direction depending on the opening or closing signal of the door 14 to rotate the guide arm 102 through the predetermined angle in the forward or rearward direction of the vehicle.

Detailed description will hereunder be given of the action of this guide arm 102. A driver's seat door switch 114 and a assistant driver's seat switch 116 are provided on the vehicle door, respectively. These door switches are adapted to connect a door closing contact 118 to a minus terminal of a vehicle battery 122 when the door is closed, and connect a door opening contact 120 to the minus terminal of the vehicle battery 122 when the door is opened. A guide arm fastening side switch 124 is interposed between the door closing contact 118 and the motor control circuit 112, and a guide arm unfastening side switch 126 is interposed between the door opening contact 120 and the motor control circuit 112, respectively. These guide arm fastening side and unfastening side switches 124, 126 are mounted at a portion adjacent the guide arm 102 for the purpose of detecting the rotational angle of the guide arm 102. When the guide arm 102 is turned to the maximum value rearward in the vehicle as indicated by solid lines in FIG. 8, the guide arm fastening side switch 124 is opened to stop the motor in operation. When the guide arm 102 is turned to the maximum value forward in the vehicles indicated by chain lines in FIG. 8, the guide arm unfastening side switch 126 is opened to stop the motor in operation. Both the guide arm fastening and unfastening side switches 124 and 126 are normally closed contacts.

In addition, the wirings of the guide arm fastening side switch 124 and motor control circuit 112 are connected to a warning circuit 128, whereby an alarm device 130 is actuated under a condition where the guide arm 102 is not moved to the maximum value to the fastening side when the occupant has entered the vehicle, i.e., the guide arm 102 is in a condition where it interferes with the clothes and the like of the occupant and is prevented from rotating. More specifically, this warning circuit 128 is connected to the vehicle battery 122 through an ignition switch 132, and, when the occupant closes the door upon entering the vehicle and starts the engine by use of an ignition key, if the guide arm 102 does not open the guide arm fastening side switch 124, i.e., the occupant is not in a properly webbing fastened condition, the warning circit 128 actuates the alarm device 130 and a warning lamp 134 so as to inform the occupant of a malfunction of the guide arm 102. Furthermore, a half-closed door switch 136 and a key forgetting preventive switch 138 are connected in series to the warning circuit 128, and, when these switches are closed, i.e., when the door is not completely closed during the operation of the vehicle and when the door is opened with the ignition key not withdrawn, the warning circuit 128 is actuated likewise so as to warn the occupant of the conditions of the half-closed door and forgotten key. Further connected to the warning circuit 128 is a buckle switch 139 incorporated in the buckle device, whereby, if the tongue plate 34 is withdrawn from the buckle device 32, then the alarm device 130 is actuated.

As shown in FIG. 11, a guide ring 142 is pivotally supported at the forward end of the guide arm 102 through a pin 140. This guide ring 142 is penetratingly provided therein with a slot 144 for guiding the inner webbing 12.

As shown in FIG. 8, this guide ring 142 is rotated about the pin 140 by the tension of the inner webbing 12 to smoothly guide the inner webbing 12 irrespective of what the turning position of the guide arm 102.

Description will now be given of the operation of this embodiment with the above-described arrangement. FIG. 1 shows a condition where the door 14 of the driver's seat is opened, in which the guide arm 102 of the guide device 24 is turned to the maximum value forward in the vehicle and in the stopped condition. As a result, the intermediate portion of the webbings 10, 12 are bent forwardly in the vehicle, and a satisfactory space for the occupant to enter or leave the vehicle is formed between the webbings 10, 12 and the seat 26. With this arrangement, the driver can easily be seated at the seat 26, and, when he sits on the seat, the actions of his legs will not be disturbed because the first anchor portion 16 secures a satisfactory space for the motions of the legs.

When the occupant closes the door 14 upon being seated, as shown by the driver's seat door switch 114 in FIG. 10, the door closing contact 118 is connected to the minus terminal of the vehicle battery 122, and the guide arm fastening side switch 124 is in the closed condition because the guide arm 102 is turned to the maximum value forward in the vehicle, with the result that the motor control circit 112 rotates the motor 110 to turn the guide arm rearward in the vehicle. When the guide arm 102 rotates to the maximum value rearward in the vehicle, the guide arm fastening side switch 124 is opened, whereby the motor 110 is stopped in operation, so that the webbings can be automatically fastened to the occupant. More specifically, the remaining portion of the inner webbing 12 is wound into the retractor 22 in accordance with the turning of the guide arm 102 rearward in the vehicle and the opposite ends of the outer webbing 10 move rearward in the vehicle in accordance with the closing circularly arcuate motion of the door 14, so that the webbings 10 and 12 can be automatically fastened to the occupant seated at the seat 26.

Furthermore, during running condition of the vehicle the inner webbing 12 can be wound out of the retractor 22 and the outer webbing 10 can pass through the through-ring 20, so that the occupant can change his driving posture.

However, in an emergency of the vehicle such as a collision, the acceleration sensor 82 in the retractor 22 brings the pawls 84 into meshing engagement with the ratchet wheels 80 to abruptly stop the webbing windout rotations of the takeup shafts 78. At the same time, the occupant is moved in the direction of the collision by a inertial force, whereby high tensions are generated in the webbings 10 and 12. These tensions rotate the lock bar 88 to cause the waveshaped projections 96 and 100 to directly lock the intermediate portion of the inner webbing 12. Consequently, no tension is generated in the inner webbing 12 wound onto the takeup shaft 78 in the retractor 22, and consequently, there should be no danger that the inner webbing 12 is wound out of the takeup shaft 78 to make the restraint of the occupant imperfect. As a result, the occupant is positively restrained by the webbings 10 and 12, thereby enabling the occupant to be secured in safety.

Furthermore, in the through-ring 20, at which the intermediate portion of the outer webbing 10 is turned back, the tilt bar 68 is caused to approach the core metal 64 by the tension of the outer webbing 10 to clamp the outer webbing 10 between the tilt bar 68 and the resin mold 66, whereby the intermediate portion of the outer webbing 10 is prevented from moving in the longitudinal direction thereof, with the result that one portion of the outer webbing 10 turned back at the through-ring 20 does not move to the other side, thus enabling the occupant to be restrained in safety.

In addition, after the completion of collision of the vehicle, if the occupant operates the buckle device 32 of the first anchor portion to release the tongue plate 34, then the occupant can unfasten the webbing 10 from his body and open the door 14 to escape from the vehicle to outside.

Upon completion of the operation of the vehicle, if the occupant opens the door 14, then the door opening contact 120 of the driver's seat door switch 114 is connected to the minus terminal of the vehicle battery 122 in the electrical wiring diagram shown in FIG. 10, and the guide arm 102 is turned to the maximum value rearward in the vehicle to close the guide arm unfastening side switch 126. Thus the motor control circuit 112 is connected to the minus terminal of the vehicle battery to rotate the motor in the reverse direction, so that the door arm 102 can be turned to the maximum value forward in the vehicle, to thereby close the guide arm unfastening side switch 126 to stop the motor in operation. As shown by the driver's seat in FIG. 1, the intermediate portions of the webbings 10 and 12 are moved by the turning of the guide arm forward in the vehicle, so that the space for the occupant to leave the vehicle between the webbings and the seat 26 can be enlarged.

The subsequent action of the occupant to enter the vehicle is made similarly to the above.

What is claimed is:

1. An automatic seatbelt system, wherein said seatbelt system has an outer webbing and an inner webbing and said webbings are automatically fastened to an occupant upon his entering a vehicle, comprising:
   (a) a first anchor portion secured to the lower portion of a vehicle door, erected upwardly in the vehicle and provided at the forward end thereof with a buckle device;
   (b) a tongue plate secured to one end of said outer webbing and engageable with said buckle device;
   (c) a second anchor portion for engaging the other end of said outer webbing with the upper portion of the door, said second anchor portion comprising:
      a mounting block fixed to a window frame, engaged with a striker having an engageable piece with slot-like cuts penetrated therethrough, said striker being secured to the vehicle body;
      an anchor plate solidly secured to said mounting block and engagable with said outer webbing;
      anchor bolts, having enlarged first end portions, projecting from said mounting block and inserted through said slot-like cuts, said enlarged first end portions being inserted at the side of said engagable piece opposite to said mounting block so that said enlarged first end portions can be engaged with said engagable piece to impart tensions of the webbings to the vehicle body;
   (d) a through-ring for engagement with the forward end of said inner webbing to movably guide the intermediate portion of said outer webbing in the longitudinal direction thereof and to prevent said outer webbing from moving in an emergency of the vehicle;
   (e) a retractor provided at substantially the central portion of the vehicle and adapted to wind up the base portion of the inner webbing by a biasing force, and to directly lock the intermediate portion of the inner webbing to prevent the inner webbing from being wound out in an emergency of the vehicle; and
   (f) a guide device for moving the intermediate portion of said inner webbing forward in the vehicle to enlarge a space for the occupant to enter or leave the vehicle when the occupant enters or leaves the vehicle.

2. An automatic seatbelt system as set forth in claim 1, wherein said buckle device is solidly secured to the forward end of a metallic anchor plate, the base portion of which is fixed to and erected from the door.

3. An automatic seatbelt system as set forth in claim 1, wherein said through-ring is provided with a core metal having an opening and the forward end of the inner webbing passes through and is turned back at said opening and sewn onto itself, whereby said through-ring is engaged with the forward end of the inner webbing.

4. An automatic seatbelt system as set forth in claim 3, wherein a tilt bar is provided at one side of said through-ring and secured to the through-ring through a resilient member, the intermediate portion of the inner webbing passes through said opening from the other side of said through-ring, is wound around said tilt bar, passes said opening again and goes away to the other side of the through ring, and, as tensions of the webbings increase, the tilt bar approaches the through-ring, thereby locking the webbings between the tilt bar and the through-ring to prevent the webbings from moving.

5. An automatic seatbelt system as set forth in claim 1, wherein, in said retractor, takeup shafts for winding up the inner webbings are pivotally supported on the frame, the intermediate portions of the inner webbings are wound around and guided by the forward ends of lock bars pivotally supported on said frame, and, in an emergency of the vehicle, said lock bars are turned, whereby waveshaped projections provided on said lock bars approach other waveshaped projections secured to the frame, thereby clamping the intermediate portions of the webbings between both waveshaped projections to lock the webbings.

6. An automatic seatbelt system as set forth in claim 1, wherein said retractor is provided therein with a pair of takeup shafts for winding up the inner webbings in the driver's seat and the passenger's seat, respectively, and further provided therein with a pair of devices for locking the intermediate portions of said webbings in an emergency of the vehicle.

7. Automatic seatbelt system as set forth in claim 1, wherein said guide device comprises a guide arm having a base portion which is fixed to an arm rotary shaft secured to a seat for seating, the intermediate portions of the inner webbing pass through a slot formed in a guide ring provided at the forward end of said guide arm, and said arm rotary shaft is rotated by a motor, whereby the guide ring is turned forward or rearward in the vehicle to enlarge a space for the occupant to enter or leave the vehicle.

8. An automatic seatbelt system as set forth in claim 7, wherein said guide ring is pivotally supported at the forward end of the guide arm to smoothly slide the inner webbing irrespective of the rotational position of the guide arm.

9. An automatic seatbelt system as set forth in claim 7, further comprising a warning circuit connected to a limit switch detecting the turning of the guide arm the maximum value rearward in the vehicle and adapted to warn the occupant in the case the guide arm is not turned to the maximum value rearward in the vehicle when the occupant has operated an ignition key upon his entering the vehicle.

* * * * *